United States Patent [19]

Meder

[11] Patent Number: 5,438,667

[45] Date of Patent: Aug. 1, 1995

[54] METHOD FOR DATA TRANSMISSION AND APPARATUS FOR IMPLEMENTATION OF THIS METHOD

[76] Inventor: Horst Meder, Schillerstrasse 18, D-7261 Ostelsheim, Germany

[21] Appl. No.: 175,689

[22] Filed: Dec. 30, 1993

Related U.S. Application Data

[63] Continuation of Ser. No. 665,299, Mar. 6, 1991, abandoned.

[30] Foreign Application Priority Data

Jan. 3, 1991 [DE] Germany .................. 41 00 056.0

[51] Int. Cl.⁶ .............................................. G06F 13/12
[52] U.S. Cl. ...................................... 395/823; 395/288; 364/228; 364/228.1; 364/231.5; 364/DIG. 1
[58] Field of Search ............... 395/275, 325, 400, 425, 395/725, 200, 500

[56] References Cited

U.S. PATENT DOCUMENTS

| | | | |
|---|---|---|---|
| 3,940,743 | 2/1976 | Fitzgerald | 395/325 |
| 4,453,211 | 6/1984 | Askinazi | 395/500 |
| 4,648,035 | 3/1987 | Fava et al. | 395/400 |
| 4,695,944 | 9/1987 | Zandveld et al. | 395/325 |
| 5,043,877 | 8/1991 | Berger et al. | 395/325 |

*Primary Examiner*—Jack B. Harvey
*Assistant Examiner*—Glenn A. Auve
*Attorney, Agent, or Firm*—Dvorak and Traub

[57] ABSTRACT

A method of bidirectional data transmission between a computer system comprising at least two computers and at least one peripheral unit e.g. a magnetic tape terminal via data paths. The computers have different control unit address administration using addressing logs. Each of the peripheral units has a unique control unit address and is connectable via normal data path to that computer which has a consistent control unit address. The procedure provides detecting the addressing logs on the data paths, whereby an addressing compatibility device is switched into the data path of a computer having a control unit address which is not identical (inconsistent) to the control unit address of the peripheral unit. An addressing generator is set to the designated control unit addresses. If the computer responds to the designated peripheral unit the addressing compatibility device identifies the control unit address cause of the preset in the addressing generator and blocks the normal data path and applies the control unit address of the peripheral unit to the data path.

14 Claims, 4 Drawing Sheets

METHOD FOR DATA TRANSMISSION AND APPARATUS FOR IMPLEMENTATION OF THIS METHOD

This application is a continuation of application Ser. No. 07/665,299 filed Mar. 6, 1991, now abandoned.

BACKGROUND OF THE INVENTION

1. Field of the Invention

The invention relates to a method for bidirectional data transmission between a computer system having at least two processors or a processor divided into a plurality of real or virtual subsystems with different control unit address administration and at least one peripheral unit with unique control unit address which is connected via data paths to said computers.

2. Description of the Related Art

The invention accordingly relates to a method for addressing compatibility of heterogeneous computer systems and also to an electronic apparatus for automatic control unit address conversion.

A heterogeneous computer system may consist of one or more processors, frequently of different type, and a number of peripheral units, such as disk memories, magnetic tape units, display devices and printers. In such a multiprocessor composite system for functional and economic reasons it is frequently expedient to make a peripheral device accessible to more than one processor.

To enable a peripheral unit to be addressed by a processor a unique control unit address must be assigned thereto. Hardware and/or software-induced or organisational restrictions in processors of different type may require different control unit addresses for the same peripheral unit. In such a case, the peripheral unit provided with a unique address can be used only by processors which address the peripheral unit via the same control unit address.

Hitherto it was necessary to use different peripheral units for different processors.

If a plurality of peripheral units is employed the result is a considerable financial expenditure. Even then, the computers cannot directly access the information (services) of the respective other peripheral unit. In such a case, until today for example in a magnetic tape system a human operator had to remove the magnetic tape from the magnetic tape system associated with the processor B and place it in a second magnetic tape system associated with the processor A.

Another possibility resides in switching the data paths over using a conventional channel switch but in that case the peripheral device must be reconfigured to the control unit address of the respective processor which in many systems is not possible or is not possible at any instant. It is only by employing such unsatisfactory ways that the processor A can have access to the services of the peripheral unit allocated to the processor B. This manifests itself as a considerable disadvantage in information processing, both from the financial and from the organisational point of view. This unsatisfactory condition is the state of the art.

It would be desirable to have available a method which permits free access of the processors to peripheral devices irrespective of possible hardware and/or software-induced restrictions.

SUMMARY OF THE INVENTION

The invention is therefore based on the problem of making available a method which permits access to peripheral units irrespective of any restrictions (hardware and/or software) and that in particular permits the simultaneous use of a peripheral unit by processors of different type.

This complex problem is surprisingly solved in a method of the type wherein the computers addressing logs are output and the addressing logs of the computers having control unit addresses which are inconsistent with the control unit address of the peripheral unit are monitored, then in a writing operation to the peripheral unit (i.e. in the direction from the computer to the peripheral unit) the control unit address to be identified in the addressing logs is automatically detected, wherein a control signal for address conversion is output, then on the basis of the control signal for address conversion the normal data path is blocked, thereby simultaneously the preset control unit address consistent with the peripheral unit is switched to the normal data path and is further conducted to the peripheral unit, then for reading data from the peripheral unit (i.e. in the direction from the peripheral unit to the computer) the control unit address transmitted by the peripheral unit is automatically recognised, then the normal data path is blocked, and instead the control unit address consistent with the computer is switched to the normal data path and further conducted to the computer and that after an effected address conversion the data transmission takes place bidirectionally.

The method according to the invention can be carried out with an apparatus which is distinguished by an addressing compatibility device in the data path between a computer, the control unit address of which is not consistent with the control address of the peripheral unit, and the peripheral unit.

Generally, the automatic address conversion is carried out in that the addressing logs on the data paths of the individual processors are monitored and if necessary converted for the purpose of addressing compatibility.

The procedure here may be that a detecting device connected into the data path of the processor which monitors the addressing log of the address/data bus. If the detecting device recognises the control unit address of the processor for the respective peripheral device, a control signal is activated and the normal data path blocked. At the same time as the blocking occurs, via an addressing device the control address of the peripheral device made available by the addressing generator is switched to the data path.

"Addressing generator" means an electronic circuit permitting presetting of the control unit address of the processor and of the peripheral device. The generated control unit addresses are used to detect the control unit address of the processor for the respective peripheral device and for making available the address valid for the peripheral device on detection.

A "detecting device" means an electronic circuit which monitors the data path and in the event of the control unit address preset in the addressing generator being present automatically outputs a control signal for address conversion. The control signal blocks the normal data path.

The addressing generator may be constructed as simple DIP switch or as chargeable storage means. In the latter case a dynamic programmable address switch-over is possible without delay and without manual intervention.

An "addressing device" means an electronic circuit which stores the preset control unit address and outputs the latter to the data path when the control signal for the address conversion is present.

With the step according to the invention as a whole the following function sequence results: the addressing compatibility device is switched into the data path of a processor having a control unit address which is not identical to the control unit address of the peripheral device. The addressing generator is set to the two designated control unit addresses. If the processor responds to the designated peripheral address the addressing compatibility device identifies the control unit address because the latter was preset in the addressing generator, said device blocking the normal data path and applying the control unit address of the peripheral device preset in the address generator to the address/data bus.

With the measure according to the invention, the computer or processor into the data path of which the addressing compatibility circuit is switched can respond to the peripheral device as if the control unit address of the processor coincided with the address of the peripheral unit. The circuit must be implemented in such a manner that the timing is observed in accordance with the interface specifications.

The electronic address monitoring device can be installed into a conventional channel switch or into any other suitable device or be available on its own.

BRIEF DESCRIPTION OF THE DRAWINGS

Examples of the invention will now be explained in detail by way of example with the aid of the attached drawings, wherein.

DESCRIPTION OF THE PREFERRED EMBODIMENT

Figure 1:
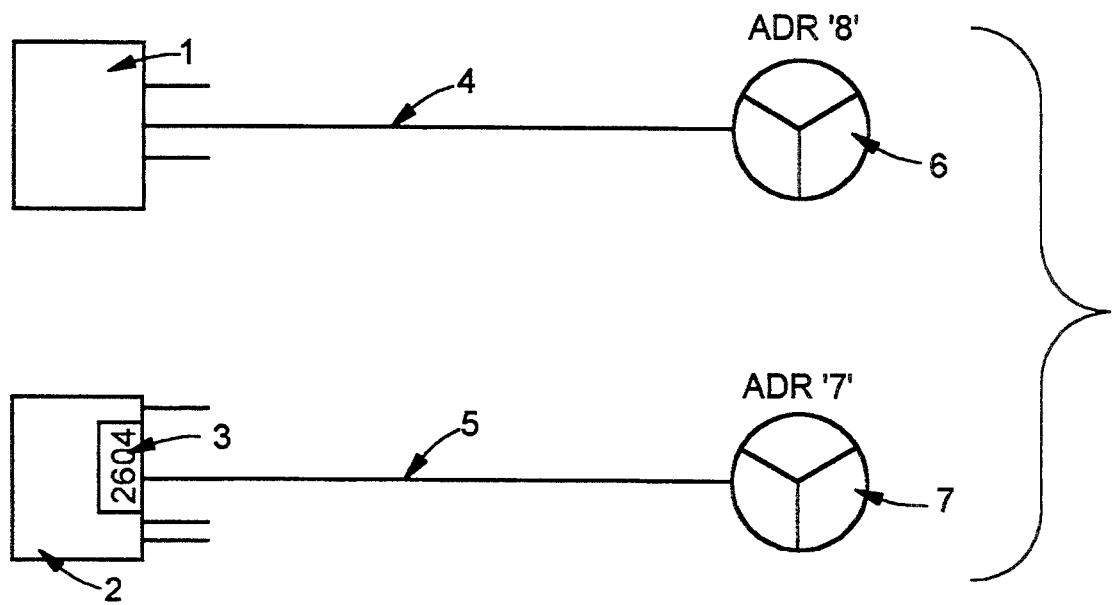
FIG. 1 shows the prior art hitherto.

FIG. 1 shows an example of a computer system consisting of the processors 1 and 2 which are not of the same type, a magnetic tape terminal device 3, the data paths 4 and 5 and the magnetic tape devices 6 and 7. The computer or processor 1 operates via the data path 4 with the magnetic tape device 6 with the control unit address '8' and the processor 2 operates via the magnetic terminal device 3 and the data path 5 with the magnetic tape device 7 with the control unit address '7'. Although the magnetic tape device 7 can be switched with a conventional channel switch from the data path 5 to the data path 4 it is supported as regards software only by the processor 2. This is the state of the art.

Figure 2:
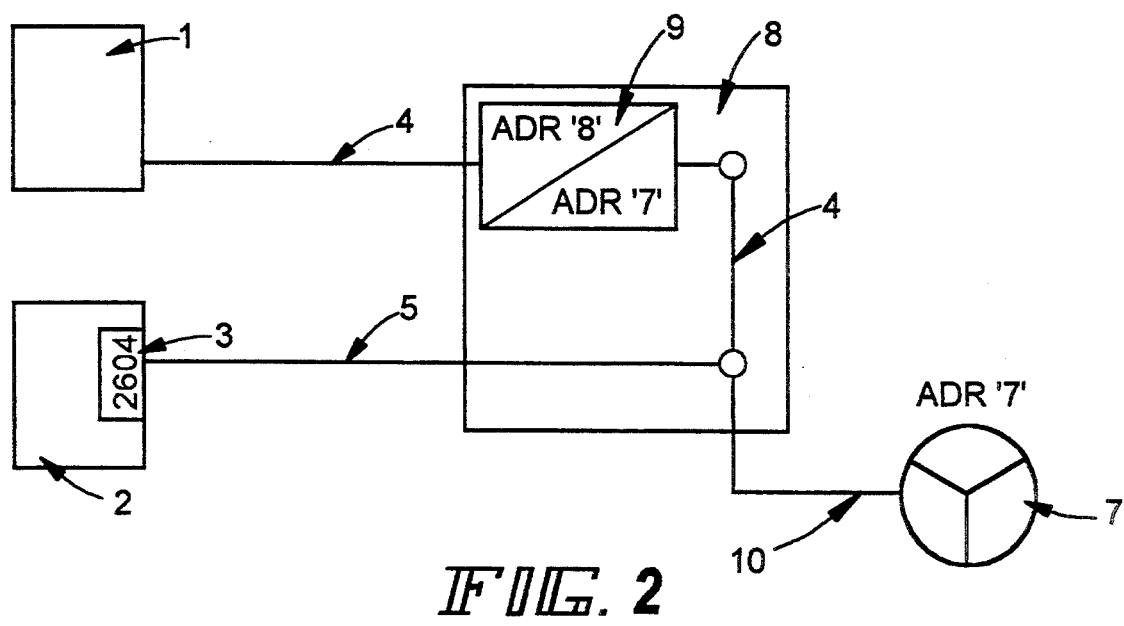
FIG. 2 shows the principle of the invention.

FIG. 2 shows an example of a heterogeneous computer system in which in particular an address converter 9 is switched into the data path 4 of the processor 1. The device 8 in which the data paths 4 and 5 are combined to a data path 10 permits together with the device 9 software support of the magnetic tape device 7 by both the computers 1 and 2. In the Figures identical reference numerals are employed for elements having the same effect.

Figure 3A:
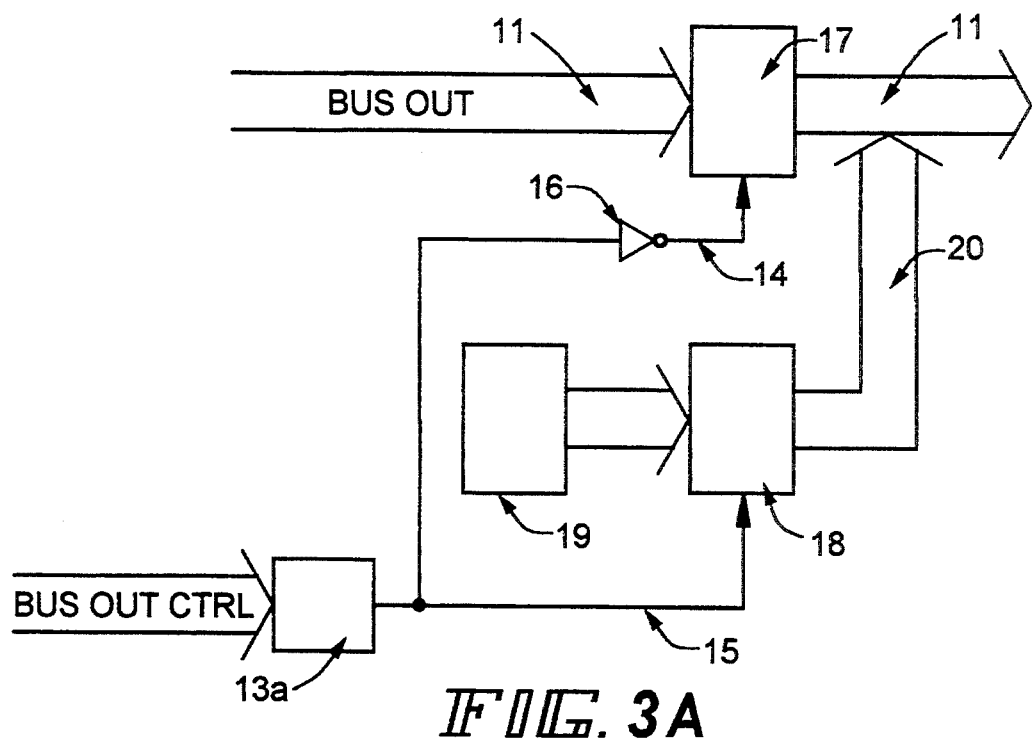
FIG. 3 is a basic circuit diagram of the addressing compatibility device.
Figure 3B:
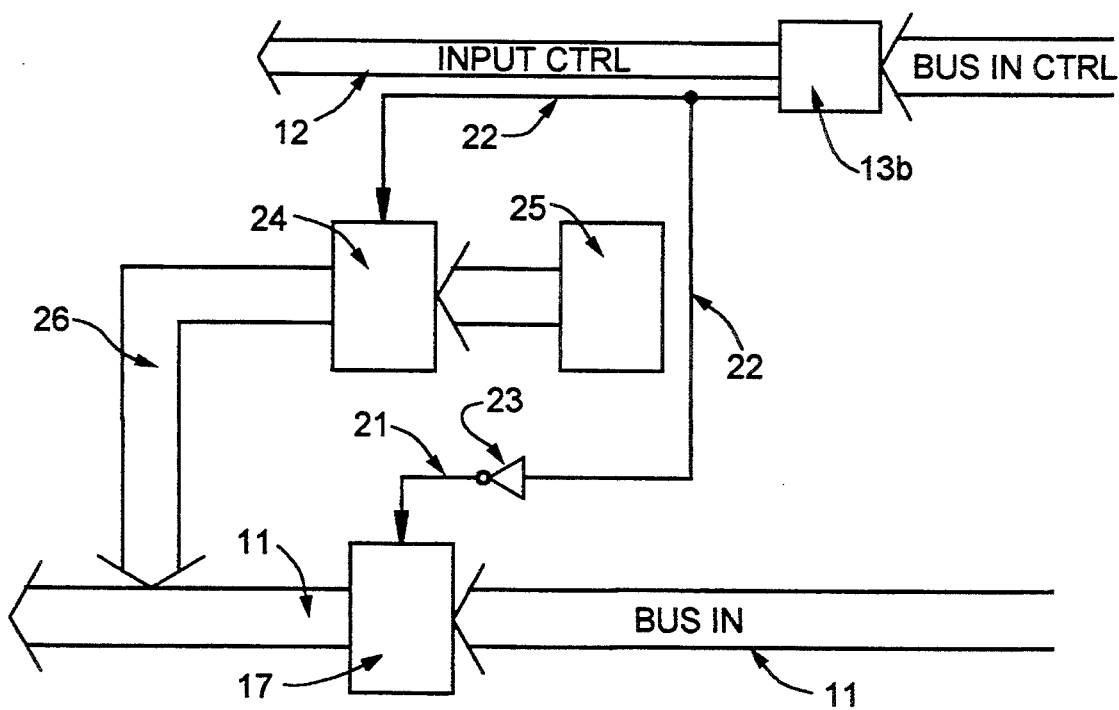

FIG. 3 shows the basic circuit of an addressing compatibility device for a channel switching system consisting of an address out logic for reading out data as shown in FIG. 3-A and an address in logic for reading in data, to be seen in FIG. 3-B.

The address out logic consists of a detecting device 13a which monitors the address log of the bidirectional address and data bus 11 and of the control bus 12, and control lines 14 and 15 which in the event of the control unit address preset in the addressing generator 19 being applied to the data bus 11 pass a control signal for address conversion to the bus driver 17 and to the addressing logic 18. The bus driver 17 blocks the normal data path for as long as the control signal for address conversion is present on the control line 14 containing an inverter 16. The addressing generator 19 makes the preset address of the peripheral device to be addressed available, said address being stored in the addressing logic 18, and via the auxiliary bus 20 applies the address to the address and data bus 11 when the control signal for the address conversion is present on the control line 15.

The address in logic is closely related to the address out logic. It consists of a detecting device 13b which monitors the addressing log of the bidirectional address and data bus 11 and of the control bus 12 and control lines 21 and 22 which in the event of the control unit address preset in the addressing generator 25 being present on the data bus 11 pass a control signal for address conversion to the bus driver 17 and to the addressing logic 24. The bus driver 17 blocks the normal data path as long as the control signal for the address conversion is present on the control line 21 containing an inverter 23. The addressing generator 25 makes the preset address of the peripheral device to be addressed available, said address being buffered in the addressing logic 24, and applies said address via the auxiliary bus 26 to the address and data bus 11 when the control signal for address conversion is present on the control line 22.

Figure 4A:
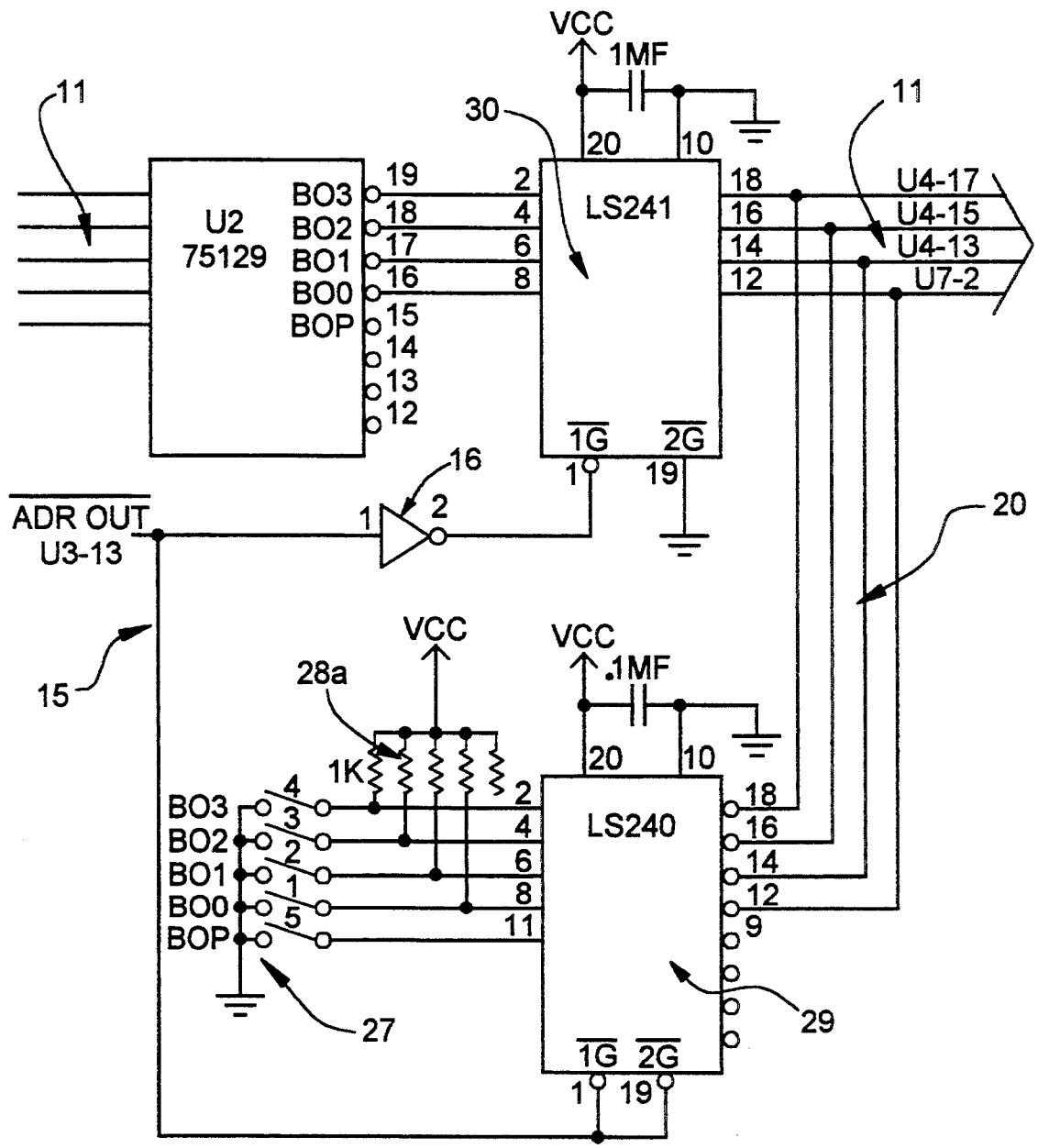
FIG. 4 is an equivalent circuit diagram of an address in logic and an address out logic.
Figure 4B:
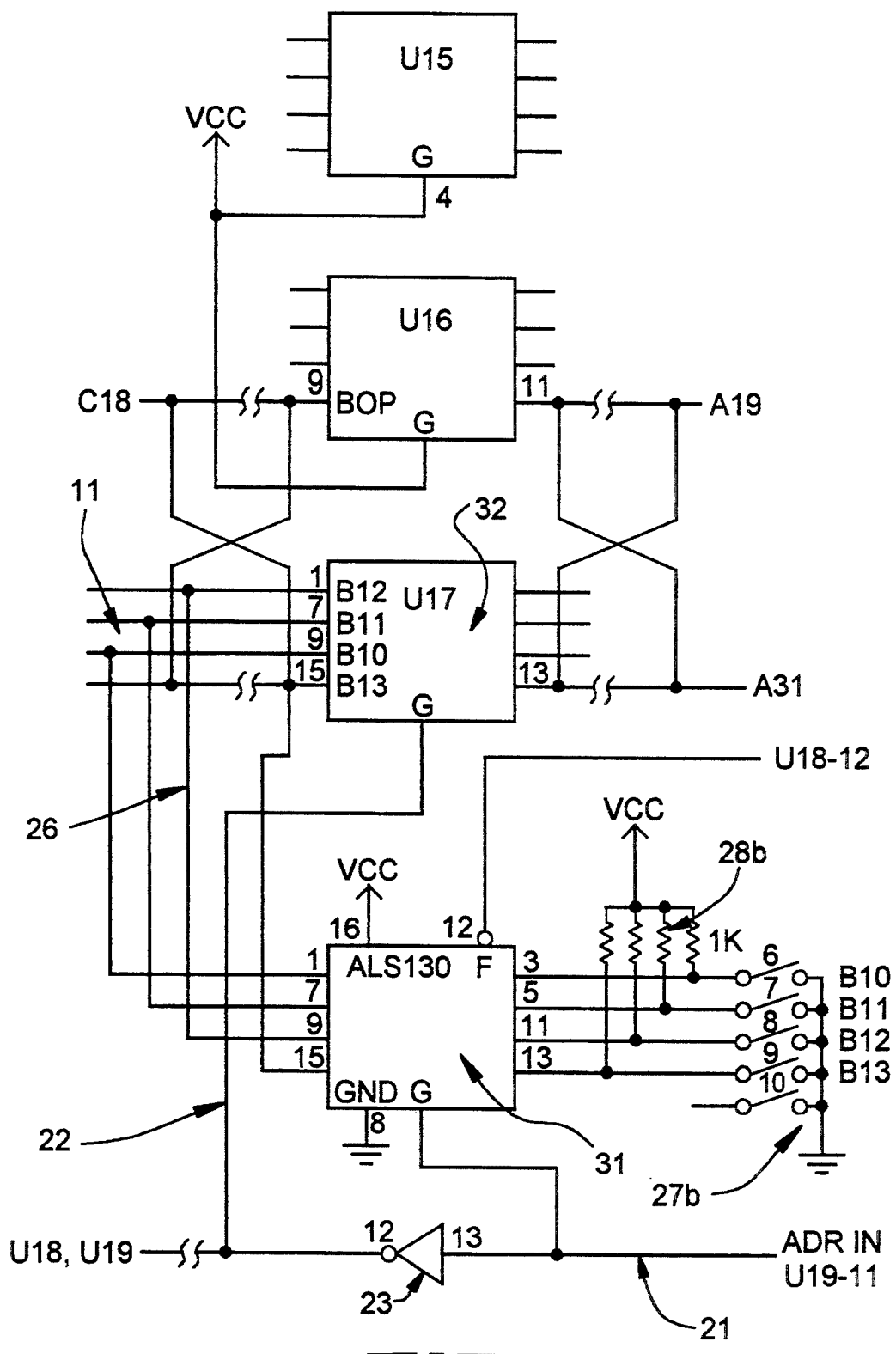

FIG. 4-A shows in the Figure at the top a detail of the electrical equivalent circuit of the address out logic consisting of a group of 4 DIP switches 27a which form the addressing generator for this part of the circuit, 4 pull-up resistances of 1 kOhm 28a, pulling the inputs 2, 4, 6, 8 of the driver chip 29 to high level when the corresponding DIP switch is open; otherwise the potential at the corresponding input of the driver chip 29 is at low level. If the control signal for the address conversion is present on the control line 15 containing the inverter 16 the enable input of the line driver chip 30 is set to high potential and the chip therefore blocked. At the same time the enable inputs 1 and 19 of the driver chip 29 are set and the address generated with the DIP switches 27 is applied via the auxiliary bus 20 to the address/data bus 11. FIG. 4-B shows in the illustration a detail of the electrical equivalent circuit diagram of the address out logic consisting of a group of 4 DIP switches 27a which form the addressing generator for this part of the circuit, 4 pull-up resistances of 1 kOhm 28a which pull the inputs 2, 4, 6, 8 of the driver chip 31 up to high when the corresponding DIP switch is opened; otherwise, the potential at the corresponding input of the driver chip 31 is at low. If the control signal for the address conversion is present on the control line 21 containing the inverter 23 the enable input of the line driver chip 32 is set to low potential and the chip therefore blocked. At the same time the enable input of the driver chip 31 is set and the address generated with the DIP switches 27b is applied via the auxiliary bus 26 to the address/data bus 11.

One example of embodiment of the invention is a computer system which consists of an IBM AS/400 having a magnetic terminal IBM 2604, an IBM/38, a magnetic tape system IBM3430, and the addressing compatibility device which is connected into the data path of one of the two processors.

I claim:

1. A method for addressing compatibility between a processor and a peripheral device, wherein the processor has a control unit address different than a control unit address of the peripheral device, the method permitting communication between the processor and the peripheral device, the method comprising steps of:

monitoring an address log of an address bus and detecting the processor control unit address on the address bus, and generating a first address conversion control signal in response to detecting the processor control unit address on the address bus;

generating the control unit address of the peripheral device and storing the control unit address of the peripheral device;

transmitting the control unit address of the peripheral device to the address bus in response to the first address conversion control signal;

blocking the processor control unit address on the address bus in response to the first address conversion control signal wherein the peripheral device is addressable by the control unit address of the peripheral device transmitted to the address bus;

detecting the peripheral device control unit address on the address bus and generating a second address control signal in response to detecting the peripheral device control unit address on the address bus;

generating the control unit address of the processor and storing the control unit address of the processor;

transmitting the control unit address of the processor to the address bus in response to the second address conversion control signal; and blocking the peripheral device control unit address in response to the second address conversion control signal wherein the processor is addressable by the control unit address of the processor transmitted to the address bus.

2. The method of claim 1, wherein the step of storing the control unit address of the peripheral device comprises buffering the control unit address of the peripheral device.

3. The method of claim 2, wherein the step of storing the control unit address of the processor comprises buffering the control unit address of the processor.

4. The method of claim 2, further comprising a step of inverting the first address conversion control signal: and inverting the second address conversion control signal.

5. The method of claim 2, further comprising a step of timing the addressing of both the peripheral device and the processor to permit communication between the processor and the peripheral device.

6. An addressing compatibility device switchable between a processor and a peripheral device: wherein the processor has a control unit address different than a control unit address of the peripheral device, the addressing compatibility device permitting communication between the processor and the peripheral device, the addressing compatibility device comprising:

first detecting device means for monitoring an address log of an address bus and for detecting the processor control unit address on the address bus, the first detecting device means generating a first address conversion control signal in response to detecting the processor control unit address on the address bus;

first addressing generator means for generating the control unit address of the peripheral device;

first addressing logic means for storing the control unit address of the peripheral device and for transmitting the control unit address of the peripheral device to the address bus in response to the first address conversion control signal;

bus driver means for blocking the processor control unit address in response to the first address conversion control signal wherein the peripheral device is addressable by the control unit address of the peripheral device stored in the first addressing logic means;

second detecting device means for monitoring the addressing log of the address bus and for detecting the peripheral device control unit address on the address bus, the second detecting device means generating a second address control signal in response to detecting the peripheral device control unit address on the address bus;

second addressing generator means for generating the control unit address of the processor; and second addressing logic means for storing the control unit address of the processor and for transmitting the control unit address of the processor to the address bus in response to the second address conversion control signal wherein the bus driver also blocks the peripheral device control unit address in response to the second address conversion control signal wherein the processor is addressable by the control unit address of the processor stored in the second addressing logic means.

7. The device of claim 6, wherein the address bus is a bi-directional address and data bus, and wherein the addressing compatibility device is disposed in the bi-directional address and data bus between the processor and the peripheral device.

8. The device of claim 7, wherein the first addressing generator means and the second addressing generator means each comprise a settable switch.

9. The device of claim 8, further comprising a first control line having a first inverter interconnecting the first detecting device means and the bus driver means, and a second control line having a second inverter interconnecting the second detecting device means and the bus driver means.

10. The device of claim 7, wherein the first control line also interconnects the first detecting device and the first addressing logic means, and wherein the second control line also interconnects the second detecting device and the second addressing logic means.

11. The device of claim 7, wherein the addressing compatibility device forms a part of a channel switch.

12. The device of claim 7, wherein the peripheral device is a magnetic tape system.

13. The device of claim 7, further comprising a second processor, wherein the second processor has a control unit address identical to the control unit address of the peripheral device, the second processor being coupled to the peripheral device.

14. The device of claim 13, wherein the processor is an IBM/38, the second processor is an IBM AS/400, and wherein the peripheral device is an IBM 3420.

* * * * *